United States Patent

[11] 3,597,672

| [72] | Inventors | Henry A. Seesselberg<br>South Plainfield;<br>Richard Beck, Morris Plains; Benjamin T. Bernstein, Metuchen, all of, N.J. |
|---|---|---|
| [21] | Appl. No. | 787,797 |
| [22] | Filed | Dec. 30, 1968 |
| [45] | Patented | Aug. 3, 1971 |
| [73] | Assignee | The Singer Company<br>New York, N.Y. |

[54] ELECTRICAL DRIVE SYSTEMS FOR SEWING MACHINES
6 Claims, 3 Drawing Figs.

[52] U.S. Cl. ............................................. 318/269,
112/220 R, 318/331, 318/380
[51] Int. Cl. ............................................. H02p 3/12
[50] Field of Search.................................... 318/257,
258, 268, 269, 331, 270, 380; 112/219 R, 220 R

[56] References Cited
UNITED STATES PATENTS

| 3,149,593 | 9/1964 | Johnston | 112/219 A |
| 3,195,488 | 7/1965 | Winberg | 112/219 A |
| 3,494,312 | 2/1970 | Kubokura et al. | 112/219 A |
| 3,501,684 | 3/1970 | Webb | 318/258 |
| 3,189,811 | 6/1965 | King | 318/269 |
| 3,268,047 | 8/1966 | Grygera | 192/18 |
| 3,295,037 | 12/1966 | Bullene | 318/269 |
| 3,463,991 | 8/1969 | Yuminaka et al. | 318/258 |
| 2,970,238 | 1/1961 | Swiggett | 310/268 |
| 3,319,591 | 5/1967 | Hamlett | 318/331 |
| 3,374,758 | 3/1968 | Mais | 318/331 |
| 3,458,790 | 7/1969 | Wilkerson | 318/269 |

*Primary Examiner*—Oris L. Rader
*Assistant Examiner*—K. L. Crosson
*Attorneys*—Marshall J. Breen and Chester A. Williams, Jr.

ABSTRACT: An electrical drive system for a sewing machine has a low-inertia DC motor drivingly coupled directly to the main shaft of the sewing machine. The motor is preferably of the type having a single low-inertia low-inductance armature immersed in a field of constant flux. A bridge rectifier using sequentially-fired drive-controlled rectifiers supplies variable direct current to the armature from a commercial AC source. A fixed rectifier bridge supplies a reference voltage which is controlled by an operator-actuated controller to phase control the firing of the controlled rectifiers to provide running speed control. The armature-generated back E.M.F. is used automatically as a speed feedback signal opposed to the reference voltage to provide good speed regulation with respect to load variations. A separate stop controlled rectifier is rendered conductive responsive to a command initiated by the controller to provide dynamic braking of the motor for quickly stopping tee sewing machine.

INVENTORS
Henry A. Seesselberg,
Richard Beck, and
BY Benjamin T. Bernstein

ATTORNEY

INVENTORS
Henry A. Seesselberg,
Richard Beck, and
Benjamin T. Bernstein

ATTORNEY

ELECTRICAL DRIVE SYSTEMS FOR SEWING MACHINES

BACKGROUND OF THE INVENTION

Over a period of years a family of induction motors containing an integral flywheel and a clutch-brake mechanism have been developed as a means for driving industrial sewing machines. These induction motors are rated at the horsepower required to drive the sewing machine continuously at the desired speed. Rapid acceleration is obtained by the storage of kinetic energy in the flywheel and the transfer of this energy by means of clutch engagement to an output shaft connected to the sewing machine main shaft by means of pulleys and a belt. Intermittent motion and variable speed are controlled by the operator's ability to slip the clutch to obtain desired performance. Stopping is controlled by a friction brake.

The principal advantage of the systems described above is the ability to use a motor rated for continuous torque output at the operating speed of the sewing machine by obtaining peak torque requirements from energy stored in the flywheel. These systems, however, suffer from a number of disadvantages, for example:

1. There are a number of mechanical slipping and impacting mechanisms required, such as clutches, brakes and belts which impart mechanical shock to the system and result in a nonuniform torque output.
2. Flywheel imbalance can cause excessive vibration.
3. Operating performance of the sewing machine varies as a function of clutch, brake, belt and pulley wear.
4. Frequent replacement of clutches, brakes and belts are required as parts glaze or wear out.
5. The motor continually consumes energy during periods when the sewing machine is idle.
6. Transmission of mechanical power through the top of the supporting table is required.
7. The speed versus time curve for acceleration shows a distinct "knee" which is characteristic of all high-inertia clutch drives and results in loss of sewing performance.

The introduction of low-inertia, moving-coil and surface-wound armature DC motors during the past few years makes possible a system to overcome all of the above deficiencies of present flywheel induction motor drives. These devices are DC motors in which the rotary armature consists of a very low-inertia copper coil or surface wound rotor containing no iron and immersed in a constant flux field preferably supplied by permanent magnets. A motor of this type is shown and described in the Swiggett U.S. Pat. No. 2,970,238. This type of motor has extremely low armature inductance and, as a consequence, exhibits an electrical time constant one or two orders of magnitude lower than that of conventional DC motors. The characteristics of such motors are: high torque-to-inertia ratio, low inductance, no magnetic saturation, low voltage and long brush life under running condition.

In accordance with the present invention, by connecting a DC motor of the above type directly to the main shaft of a sewing machine and providing controlled rectifier circuitry, as will be described herein, for supplying a controlled direct current to the motor for deriving a driving torque, or selectively, for supplying an electrical load to the armature for deriving a dynamic braking torque from the motor, all the functions presently performed by flywheel induction motors with clutch brakes can be performed in equal or better manner and without the disadvantages inherent in these prior art devices as noted above.

The system to be described herein drives a sewing machine by directly coupling said sewing machine, without belts or pulleys, to a single, rotary, low-inertia armature immersed in a constant flux field and journaled for simple rotary motion in suitable bearings. Rapid acceleration and control of running speed is obtained solely by controlling with suitable solid-state circuitry the direct current passed through the armature for motoring operation. Rapid deceleration is obtained by similarly controlling the armature current furnished by the armature to a dissipative load during dynamic braking of the motor. All operations are responsive to simple command signals generated by an operator-actuated controller.

It is a primary object of this invention to provide an electrical drive system for a sewing machine of the industrial type which eliminates the need for any clutches or brakes or for any transmission of mechanical power through the top of the supporting table.

It is a further object of this invention to provide a system of the type in which a drive unit is a DC low-inertia motor and forms part of the sewing machine itself and in which the control of the acceleration, the speed and, the deceleration of the sewing machine is solely a function of the direct current flow into and out of the motor armature under the control of a single operator-actuated device.

It is a still further object of this invention to provide solid-state circuitry for the above system utilizing sequentially fired controlled rectifiers in a polyphase, phase-controlled arrangement which distributes the load current equally over the AC phases to prevent a single-phase overload.

It is a still further object of this invention to provide a drive system for a sewing machine which does not depend on mechanical energy storage devices for obtaining high acceleration torques but rather utilizes the fast current response of a direct-connected, low-inductance, low-inertia armature immersed in a constant flux field to provide a driving and/or braking torque proportional to the current.

An important feature of the system of this invention is that the accelerating torque is not limited by mechanical energy storage as in the prior flywheel systems, which latter require time for restoring the energy extracted during each accelerating period. Where frequent closely spaced starts and stops are required, as is usually the case in industrial sewing, the top speed may not be reached in the time required because the flywheel must slow down to release its energy for accelerating the sewing machine. With the system of this invention, however, the acceleration torque depends only on the current which is quickly built up in the motor armature due to its very low inductance and the armature adds substantially no rotational inertia to the system. As a result, the sewing machine is quickly accelerated all the way up to top speed and can perform more stitches per unit time during this period than the prior art systems.

DESCRIPTION OF THE INVENTION

Figure 1:
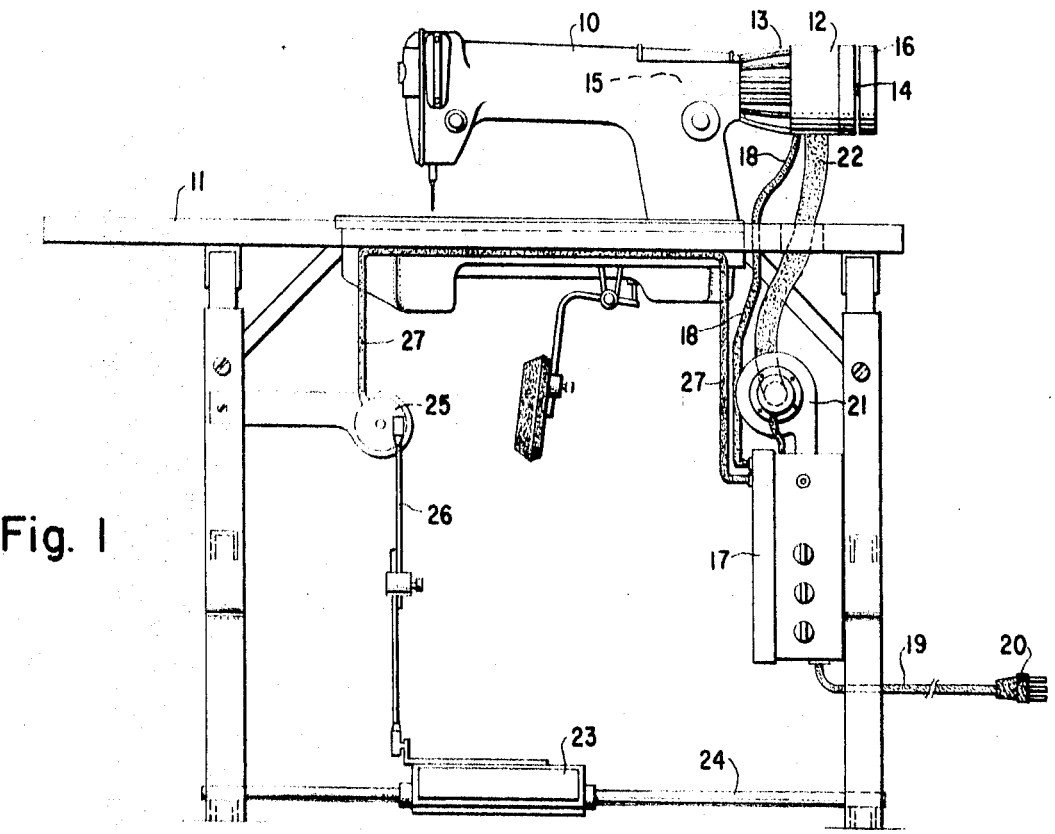
FIG. 1 is a front elevational view showing an embodiment of the system of this invention.

Referring now to FIG. 1, a sewing machine 10 of conventional industrial type is shown mounted on a table 11. A motor 12, of the general type shown and described in detail in the Swiggett U.S. Pat. No. 2,970,238, and having an armature 12', is secured to the frame of the sewing machine 10 by a bracket 13. A shaft 14 rotatable with the armature 12' extends from both ends of the motor 12. The shaft 14 is coupled at one end directly to the arm shaft 15 of the sewing machine and at the other end to a handwheel 16.

A box 17 mounted below the table top contains circuitry later to be described for supplying a variable direct current to the motor 12 by way of conductors contained in cable 18 which passes through the top of the table 11 and connects with the motor armature 12'. A cable 19 terminates in a plug 20 adapted to be connected to a regular commercial source of polyphase AC voltage.

A conventional motor blower 21 may be mounted on the top of box 17 to provide ventilating air flow through the box to facilitate the cooling of circuit components contained therein, if required. A flexible suction hose 22 may connect the inlet of the blower 21 with a vent opening in the motor 12 which has a conventional inlet open to the atmosphere. Thus air drawn through the motor may also be forced through the circuit box 17 for simultaneous cooling of the motor and the circuit components.

It will be noted that the only elements passing through the table top are the cable 18 and the hose 22 and these are stationary and do not require critical positioning. No mechanical power-transmitting elements of any kind are required to pass through the table top in this system which greatly facilitates the assembly, and improves the safety by eliminating the possibility of human contact with moving parts.

A conventional treadle 23 pivoted on rod 24 is connected to a control element 25 by means of pitman 26. As will be described later, the control element 25 may comprise a resistance whose value is adjusted by means of movement of the pitman 26 responsive to positions of the treadle 23 controlled by an operator. Element 25 may also contain a switch which is normally open but can be closed by proper reverse manipulation of the treadle 23. A cable 27 contains conductors electrically connecting the control element 25 to the circuit components contained in box 17 so that commands put in by the operator at treadle 23 are translated into circuit changes which result in changes in the current to the motor armature 12' to effect acceleration, speed control and/or braking of the sewing machine in direct accordance with the torque changes developed by the motor.

A circuit for providing the changes in current flow to the motor 12 responsive to treadle commands is shown in detail in FIG. 2 and will now be described.

A three-phase transformer 30 has primary windings 31 connected through fuses 32 and a main switch 33 to a commercial source S-S of polyphase AC voltage. The secondary windings 34 are connected to lines 35, 36 and 37 and provide on these lines polyphase AC voltage of a value lower than that of the source S-S, and compatible with the low voltage requirements of the motor 12.

Fixed rectifiers 38 have their anodes connected to lines 35, 36 and 37 respectively and their cathodes connected in common to line 39 to provide a DC bus having positive polarity as shown. Fixed rectifiers 40, have their cathodes connected to lines 35, 36 and 37 respectively and their anodes connected in common to line 41 to provide a DC bus having negative polarity as shown. It will be understood that, as long as switch 33 remains closed, a DC reference voltage of constant value appears on lines 39 and 41.

The reference voltage is applied by lines 42 and 43 to a potentiometer resistance 44 in the control element 25. A sliding tap 45, adjustable by movement of the pitman 26 responsively to operator-actuated movement of the treadle 23, provides on line 46 a variable DC control voltage of positive polarity with respect to line 41. In the relaxed position of the treadle, as shown in FIG. 2, a spring 47 biases the pitman 26 to position the tap 45 at the top of resistance 44 so that the voltage on line 46 is zero with respect to that on line 41. As the treadle 23 is depressed the voltage on line 46 increases continually until, at full treadle position, it is a maximum and can, if necessary, be made equal to the voltage on line 39. As will be explained presently, any motor speed value up to a maximum desirable value can be set by the choice of the control voltage established on line 46 by manipulation of the treadle 23. In the relaxed position of treadle 23 no control voltage is provided on line 46 and no driving current is fed to the motor armature 12'.

A fixed voltage divider consisting of resistances 48 and 49 connected in series across lines 39 and 41 provides on line 50 a positive control voltage of a predetermined value. When the treadle 23 is reversed or heeled, a switch 51 in controller 25 is closed which connects line 50 with line 52 to energize a dynamic braking circuit for the motor 12 as will be explained presently.

Silicon-controlled rectifiers (SCR's) 53 have their anodes connected respectively to lines 35, 36 and 37 and their cathodes connected in common to line 54 which connects to the positive terminal 55 of the motor 12. The negative terminal 56 of motor 12 is connected by lines 57 to line 41.

From the above it will be clear that the three controlled rectifiers 53, and the three fixed rectifiers 40, constitute a polyphase bridge rectifier system for providing a variable direct current to the motor armature 12' from polyphase AC lines 35, 36 and 37 by way of lines 54 and 57 and of a value dependent on the firing or conduction phase angle of the controlled rectifiers 53.

The energy for firing the drive SCR's 53 is obtained by charging respective capacitors 58, 59 and 60 through respective series resistances 61, 62 and 63 from the control voltage on lines 46 and 41. The rate of voltage rise on capacitors 58, 59 and 60 will depend on the RC value and on the value of the control voltage as determined by the setting of the tap 45.

Threshold trigger devices known as silicon unilateral switches (SUS's) and indicated as elements 64, 65 and 66, are used to control the discharge of the respective capacitors 58, 59 and 60 into the gates of the respective SCR's 53 at the proper time with respect to the positive half cycles of anode voltage on the SCR's to sequentially trigger the SCR's into conduction in synchronism with the phase sequence of the AC polyphase voltage on lines 35, 36 and 37. This sequential synchronous triggering has the important result of distributing the AC current loading equally on all three phases so that any one phase will not be overloaded. This is of special importance in this application where the peak direct current to the motor is necessarily high for providing high initial torques for rapid acceleration.

It will be noted that the (SUS's) 64, 65 and 66 each have a gate terminal, respectively 67, 68 and 69, which is connected to a common point between series resistance pairs 70 and 71. Each of the resistances 70 connects to the same line (35, 36 or 37) to which the anode of the associated SCR 53 is connected. The resistances 71 are connected in common to the line 41. The above connections to the gates 67, 68 and 69 supplies a zero-crossing detection for the (SUS's) to synchronize the sequential firing of the SCR's 53 with the phase rotation of the AC voltage as will be explained.

The amount of current flowing through the motor load is determined by the conduction portion of the half cycle which biases each SCR 53 in the forward direction, i.e. the conduction phase angle. This phase angle is determined by the point in time after the phase voltage on lines 35, 36 and 37 crosses zero that the SCR gate is biased on. The SCR gates are fed by the (SUS's) 64, 65 and 66. These diodes have a relatively high forward impedance until the voltage across them reaches a certain level, typically 6—10 volts. Then the forward impedance is reduced to near zero and the diode conducts heavily until its current reduces to zero, at which time its impedance goes high again. Therefore one method of triggering the SUS diode into conduction is to raise its anode to cathode voltage above its firing threshold. Another way to cause conduction is to reduce the diode gate voltage below the anode voltage by the zero-crossing connections described above. A similar circuit using an SUS for controlling the triggering of an SCR is shown and described on pages 213 and 214 of the SCR Manual, 4th Edition published by General Electric in 1967 to which reference may be made for a more detailed explanation thereof.

OPERATION

Figure 2:
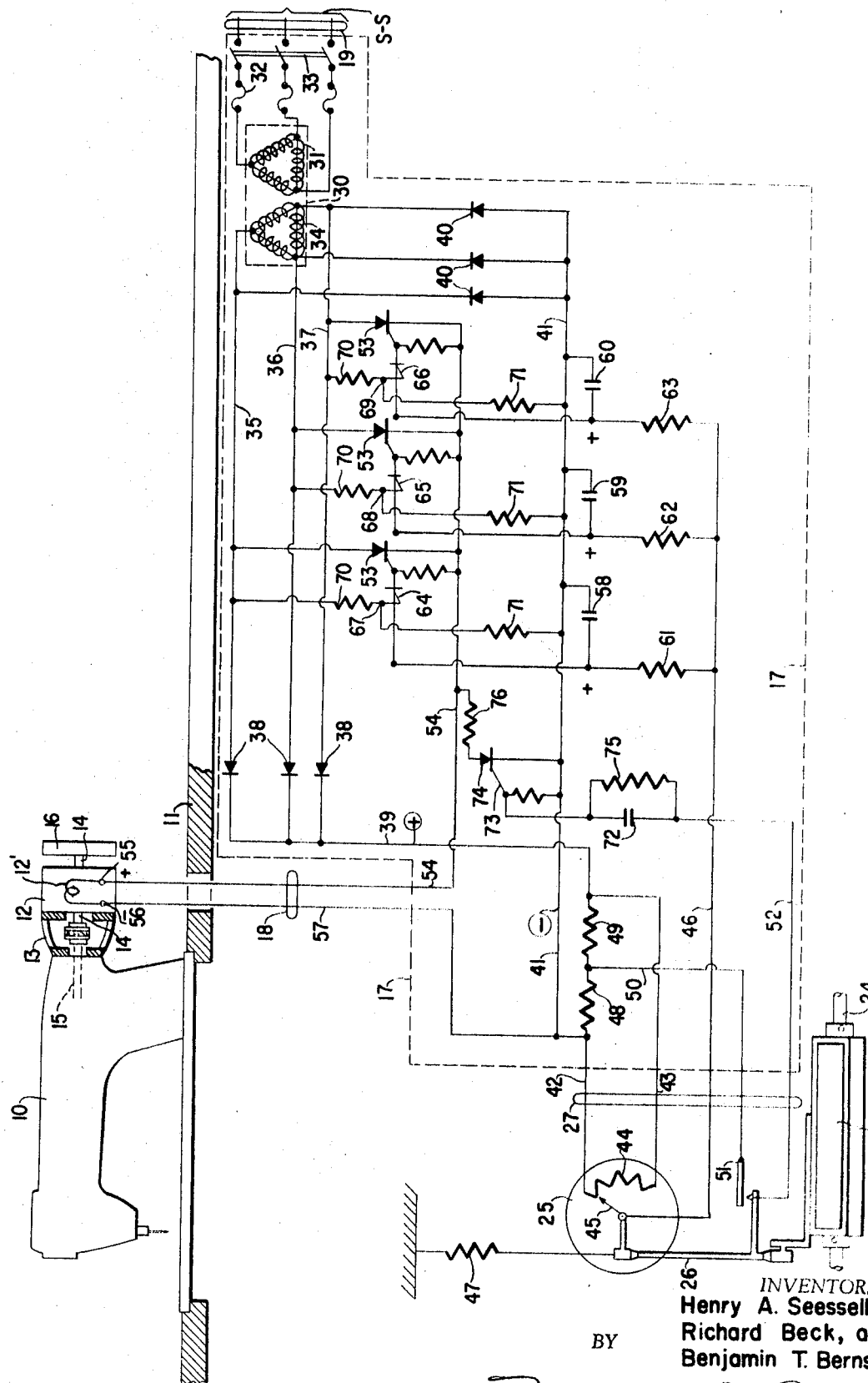
FIG. 2 is a complete schematic circuit diagram for the electrical components used in the embodiment of FIG. 1.

To explain the operation of the trigger circuit, consider the system at rest with the treadle 23 in relaxed position as shown in FIG. 2. All SCR's 53 are off and no current flows through them or through the motor armature 12'. Diodes 38 and 40 provide a nearly constant DC voltage across the potentiometer resistance 44.

The operator now depresses treadle 26 to move tap 45 to supply on line 46 a DC level greater than the threshold-firing level of the SUS's 64, 65 and 66. This will cause capacitor 58, 59 and 60 to charge to the voltage on line 46 through the respective resistances 61, 62 and 63 at a rate determined by the RC time constant. The conduction of each SUS occurs when the AC voltage on the anode of its associated SCR goes through zero and no current passes through the motor. However, this has the effect of resetting each capacitor 58, 59 and 60 to zero charge at the beginning of the positive half cycle for each phase and thereafter each capacitor charges in sequence till the threshold level of the SUS connected to its positive terminal is reached and a gate pulse to the associated SCR causes conduction thereof for the remainder of the positive cycle on this phase. This is the synchronous triggering operation referred to above.

Conduction of the SCR's 53 in sequence as above described passes current to terminals 55 and 56 and through the armature 12' of motor 12 causing rotation thereof and a resultant back E.M.F. on lines 54 and 57 is generated. It will be noted that this back E.M.F. is in series opposition to the voltage on capacitors 58, 59 and 60 with respect to the anode-cathode voltage on the SUS's. Thus, as the motor 12 comes up to speed for a given setting of tap 45, the capacitors 58, 59 and 60 have to charge to a higher voltage to overcome the back E.M.F. generated in order to reach the threshold voltage of the SUS's. This delays the conduction of the SCR's and shortens the conduction period of the SCR's in each positive half cycle and reduces the average direct current fed to the motor armature 12'. A rotational speed will be quickly reached where the conduction angle is just sufficient to supply the average current to armature 12' necessary to furnish the load torque at that speed and the motor 12 will run at this balancing stable speed.

If, at this stable speed, the torque load should increase due, for example, to increased seam thickness, the speed would tend to decrease. Therefore the back E.M.F. would go down, the net voltage across the SUS's would increase and the firing angle would be advanced causing an increase in the average direct current to the armature 12' resulting in an increased driving torque and an increase in speed back to the original balancing speed. Similarly, a decrease in torque load will automatically retard the firing angle, resulting in decreased average current to the armature 12' and a return to the balancing speed set by the tap 45. Thus the system of this invention provides operator-actuated means for selecting a desired speed and automatic means for regulating the selected speed with respect to load variations.

It will be apparent to those skilled in this art that the potentiometer 44, 45, could be replaced by a set of switchable resistors for selecting discrete speed settings. It is also understood that resistances 61, 62, 63 may be variable or may be selected so that the firing angles for all three phases can be closely matched.

Thus far there has been described only the drive function of the circuit of FIG. 2. There will now be described the braking function of this circuit by which the sewing machine 10 may be quickly stopped.

The switch 51 (which may be incorporated in the controller 25) is coupled to the treadle 23 in such a way as to close only when the treadle is reversed or heeled. When this happens, the voltage on line 50 is applied to line 52 and is transferred through capacitor 72 as a single voltage pulse to the gate 73 of a stop SCR 74. A resistance 75 shunts the capacitor 72 and controls its discharge rate for resetting. At this treadle position, the tap 45 is as shown in FIG. 2 so that the voltage between lines 46 and 41 is zero and prevents any further drive to the motor 12 from conduction of the drive SCR's 53. As there is a substantial back E.M.F. from the armature 12' due to its rotation in a constant flux field, even without drive from the drive SCR's 53, the triggering into conduction of the stop SCR 74 causes current to flow through it and through a load resistance 76. If the value of this resistance 76 is low, allowing large current to flow, the motor acts as a DC generator working into a heavy load and the stored kinetic energy is quickly absorbed in the losses dissipated in resistance 76 and the motor 12 and connected sewing machine 10 are rapidly decelerated. This is known as dynamic braking. It will be noted that the capacitor 72 allows only one pulse to pass to the gate 73 and, since the anode-cathode voltage is supplied by the DC back E.M.F. generated by the rotating armature 12', the stop SCR 74 is latched into conduction by this single pulse. As soon as the armature 21' has decelerated to near zero velocity, the stop SCR 74 turns off due to insufficient holding current. This leaves the system at rest and ready for another sew cycle.

PERFORMANCE

Figure 3:
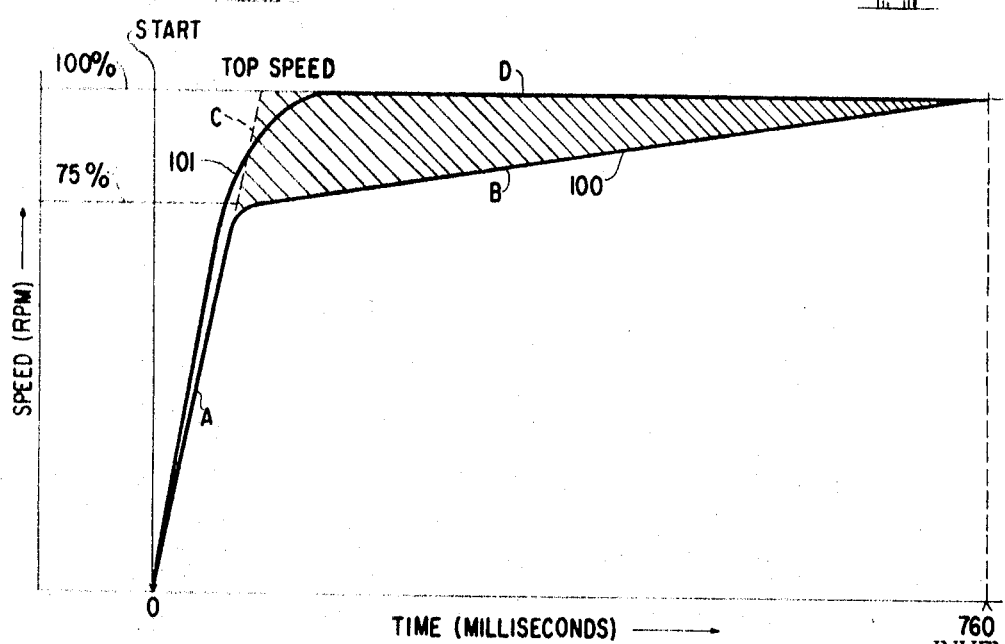
FIG. 3 is a comparison graph showing the speed versus time response of an industrial sewing machine for a typical starting cycle using a prior art clutch-brake drive system and using the direct drive system of this invention.

Referring now to FIG. 3, curve 100 is a plot of the rotational speed versus time of the armshaft of a regular Singer Model 281-1 Industrial Sewing Machine driven by a regular Singer Series 52/53 Clutch-Brake Transmitter and representing good prior art performance. At time $T=0$ the sewing machine is commanded to run by fully depressing the treadle to engage the clutch. The initial portion A of curve 100 shows a constant rapid acceleration up to a speed of approximately 75 percent of the top speed where a definite "knee" occurs and the remainder portion B of the curve 100 shows a much lower acceleration reaching top machine speed in approximately 760 milliseconds total elapsed time. This "knee" has been found to be an inherent characteristic of all high-inertia clutch-brake drives and represents the point at which the energy stored in the flywheel ceases to contribute to the accelerating torque. The motor torque must thereafter accelerate both sewing machine and flywheel to restore the kinetic energy to the flywheel, which energy was lost in the initial accelerating operation.

It would of course be desirable to continue acceleration along portion A as shown by the dashed portion C up to the top speed D and the area (shown hatched) included between the portion B and the top speed line D represents the potential sewing stitches lost when using prior art high-inertia clutch-brake drives.

Curve 101 in FIG. 3 is a plot of the rotational speed versus time of the armshaft of a regular Singer Model 281-1 Industrial Sewing Machine driven directly by a low-inertia fast-response DC motor of the type U12M4 manufactured by Printed Motors, Incorporated, New York, N.Y., and controlled in accordance with the system of this invention. At time $T=0$ the sewing machine is commanded to run at top speed by depressing the treadle 23 fully. As shown by curve 101, the initial acceleration is higher than for curve 100 and demonstrates the advantage of this system in quickly establishing in the armature 12' high direct current and therefore high torque by virtue of the low inductance of the armature and the initially advanced firing angle of the drive SCR's 53. It will be noted that, as the motor 12 comes up to speed, the slope of curve 101 gradually decreases and finally becomes tangent to the top speed line D. This reflects the effect in this system of the back E.M.F. of the armature 12' in retarding the firing of the drive SCR's 53 proportionally with the armature speed increase and supplies an automatic current limiting action which is beneficial in preventing sustained high current to the armature 12' but without adversely affecting the torque.

By comparing curves 100 and 101, it will be immediately apparent that the accelerating characteristic of the system according to this invention shows no "knee" and provides significantly better sewing performance than the high-inertia clutch systems heretofore used as the accepted prior art system. The area shown hatched in FIG. 3, which was not available for making stitches with the prior art system, is now substantially utilized to full advantage in producing sewing stitches in accordance with the attributes of this invention.

While curve 101 represents the maximum accelerating capability of this particular system to full top speed with treadle 23 fully depressed, it will be understood that intermediate speeds may readily be selected by partial depression of the treadle 23, and a family of curves similar to 101 can be generated, each with a different top speed. The facility of this variable speed control is in sharp contrast to the operator skill required to control the slip of the clutch with its erratic behavior, as is necessary with the prior art drive systems in order to establish intermediate speeds.

While the system as disclosed shows an operator-actuated treadle for putting in sewing commands, the basic electronic nature of this system makes automatic programmed sewing readily possible without large electromechanical or pneumatic controls.

Since there are no belts and pulleys and since speeds are set solely by voltage changes, changing top speed on a sewing machine used in the system of this invention can be accomplished by a simple potentiometer adjustment. A beginning operator may use the machine at low speed to learn and eventually sew at high speeds on the same machine, all by simple electrical adjustment.

From the above it will be apparent that, in accordance with this invention, there is provided an electric drive system for modern high speed industrial sewing machines having significantly superior performance characteristics over those of prior art systems representing the best systems presently available.

While the invention has been described by means of a specific example and in a specific embodiment, it is not intended that it be limited thereto, and obvious modifications will occur to those skilled in the art without departing from the spirit and scope of the invention.

Having thus set forth the nature of the invention, what we claim herein is:

1. An electrical drive system for a sewing machine having a shaft, said system being energizable from a commercial source of AC voltage comprising; a rotary armature immersed in a constant flux field and coupled continuously to said shaft, first controlled rectifier means providing a variable direct current supply only for said armature from said AC voltage source, second controlled rectifier means providing continuous dynamic braking of the armature, rectifier means providing a DC reference signal, and single adjustable means operative in a forward direction from a relaxed position for controlling the reference signal to selectively fire the first controlled rectifier means to control the acceleration of the sewing machine and operative in a reverse direction from the relaxed position to fire the second controlled rectifier means to control the deceleration of the sewing machine.

2. An electrical drive system for a sewing machine energizable from a commercial source of polyphase AC voltage comprising; a DC motor having a high torque-to-inertia ratio, a rotary armature for said motor immersed in a constant flux field and continuously coupled to said sewing machine, a transformer connected to said voltage source and providing a polyphase AC voltage output of lower value than said source, first rectifier means providing a variable direct current supply only for said armature from said lower voltage output, second rectifier means providing continuous dynamic braking of the motor, and single adjustable means operative in opposite directions from a relaxed position for controlling respectively said first and second rectifier means to selectively control the acceleration and deceleration of said sewing machine.

3. An electrical drive system for a sewing machine energizable from a commercial source of polyphase AC voltage comprising; a DC motor, a rotary armature for said motor immersed in a constant flux field and continuously coupled to said sewing machine, circuit means providing a variable direct current supply only for said armature from said polyphase AC voltage source, adjustable means for controlling the variable direct current fed to the armature to set a predetermined speed for said sewing machine, means responsive to the angular speed of the armature for automatically controlling the armature current to maintain the predetermined speed constant with respect to load changes, further circuit means providing controlled continuous dynamic braking of said armature to control the deceleration of the sewing machine, and single actuated means operative in opposite directions from a relaxed position for conjointly controlling said adjustable means responsively to motion in one direction and the energization of said further circuit means responsively to motion in the opposite direction.

4. An electrical drive system in accordance with claim 3, in which the variable direct current supply comprises a single separate controlled rectifier for each of the phases of the polyphase AC voltage including means for sequentially triggering the rectifiers to load each phase equally.

5. An electrical drive system for a sewing machine energizable from a polyphase AC voltage source comprising; a DC motor having a low-inductance, low-inertia rotary armature immersed in a constant flux field and continuously coupled to the sewing machine, fixed rectifier means providing a constant DC reference signal, adjustable means for controlling the value of the reference signal, first controlled rectifier means for supplying variable direct current only to the armature, triggering means responsive to the adjustable means for sequentially firing said first controlled rectifier means in synchronism with the phase rotation of the polyphase AC voltage to supply driving torque to the sewing machine, means responsive to the rotational speed of the armature to modify the sequential firing to automatically maintain a constant sewing speed set by the adjustable means, second controlled rectifier means, means for triggering said second controlled rectifier means to energize a dynamic braking circuit only for the armature to provide a continuous braking torque to the sewing machine, and single control means operative in opposite directions from a relaxed position for controlling respectively the adjustable means and the means for triggering the second controlled rectifier means.

6. An electrical drive system for a sewing machine energizable from a source of AC voltage comprising; a DC motor having a low-inertia low-inductance rotary armature immersed in a constant flux field and continuously coupled to the sewing machine, first controlled rectifier means for supplying a variable direct current only to the armature from said polyphase voltage source, means including gated threshold diodes for supplying triggering pulses to said first controlled rectifier means in phase synchronism with the polyphase AC voltage in response to a start command signal, means responsive to the angular speed of the armature for automatically controlling the phase position of said triggering pulses to provide a constant speed, second controlled rectifier means for energizing continuously a dynamic braking circuit only for said armature, means for supplying a single triggering pulse to the second rectifier means in response to a stop command signal, and single means for alternatively establishing the start and stop command signals by positive movement thereof in respective forward and reverse directions from a relaxed position.